US006243246B1

(12) United States Patent
Lin

(10) Patent No.: US 6,243,246 B1
(45) Date of Patent: Jun. 5, 2001

(54) DEVICE FOR WARNING BREAKDOWN OF AUTOMOTIVE CIRCUIT

(76) Inventor: Chwen-Ru Lin, P.O. Box 23-487, Changhua City 500 (TW)

( * ) Notice: Subject to any disclaimer, the term of this patent is extended or adjusted under 35 U.S.C. 154(b) by 0 days.

(21) Appl. No.: 09/370,182

(22) Filed: Aug. 9, 1999

(30) Foreign Application Priority Data

Mar. 18, 1999 (TW) .................................................. 88204035

(51) Int. Cl.[7] ..................................................... H02H 5/04

(52) U.S. Cl. ............................................ 361/104; 340/638

(58) Field of Search .................................... 361/103, 104, 361/93.1, 93.8; 340/638; 307/10.1, 10.7

(56) References Cited

U.S. PATENT DOCUMENTS 4,499,447 * 2/1985 Greenberg ............................ 337/266
4,772,219 * 9/1988 Falchetti .............................. 439/490
4,815,993 * 3/1989 Falchetti .............................. 439/622
5,311,139 * 5/1994 Fogal .................................. 324/550
5,701,118 * 12/1997 Hull et al. ........................... 340/638
5,841,337 * 11/1998 Douglass ............................. 337/198
5,986,558 * 11/1999 Crawford et al. .................. 340/638

* cited by examiner

*Primary Examiner*—Michael J. Sherry

(57) ABSTRACT

A device for warning an automotive circuit breakdown comprises a housing and an apparatus located in the housing and provided with a negative conductive piece, a positive conductive piece, a fuse connecting the negative conductive piece and the positive conductive piece, a light-emitting diode fastened with the negative conductive piece, and a coiled spring fastened at one end thereof with the positive conductive piece and at other end thereof with an elastic piece. When the electric current of the automotive circuit becomes too strong, the fuse melts to break the circuit. The electric current is then made available via the coiled spring and the elastic piece to the light-emitting diode which emits light to warn of the automotive circuit breakdown.

1 Claim, 3 Drawing Sheets

DEVICE FOR WARNING BREAKDOWN OF AUTOMOTIVE CIRCUIT

FIELD OF THE INVENTION

The present invention relates generally to an electric circuit of motor vehicles, and more particularly to a device for warning the breakdown of the electric circuit of motor vehicles.

BACKGROUND OF THE INVENTION

The automotive circuit is generally not provided with a means for detecting and warning the possible failure of the circuit. As a result, when the circuit breakdown takes place, the circuit is checked by an automotive mechanic to locate the breakdown. Such a trouble-shooting is not only expensive but also time-consuming.

SUMMARY OF THE INVENTION

The primaly objective of the present invention is therefore to provide a device for detecting and warning an automotive circuit breakdown. The device comprising a housing and an apparatus for detecting and warning the automotive circuit breakdown. The apparatus is provided with a positive conductive piece, a negative conductive piece, a fuse connecting the positive conductive piece and the negative conductive piece, a light-emitting diode fastened with the bottom of the negative conductive piece, and a coiled spring fastened at one end thereof with the bottom of the positive conductive piece and at other end thereof with an elastic piece. As the electric current becomes too strong, the fuse melts, thus breaking the circuit. The current is then transmitted via the spring and the elastic piece to the light-emitting diode which emits light when voltage is applied.

The foregoing objective, features and functions of the present invention will be more readily understood upon a thoughtful deliberation of the following detailed description of a preferred embodiment of the present invention with reference to the accompanying drawings.

DETAILED DESCRIPTION OF THE EMBODIMENT

Figure 1:
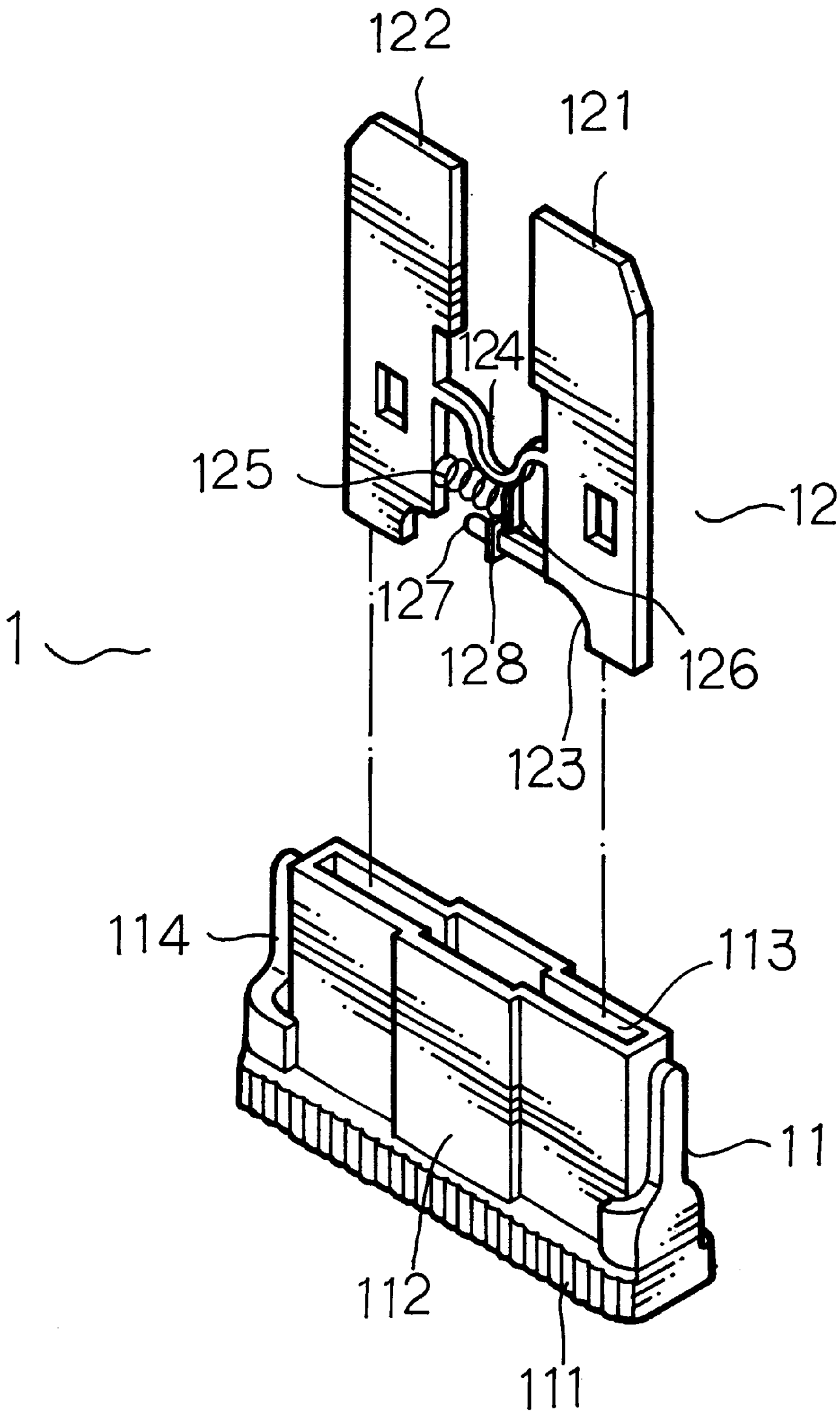
FIG. 1 shows an exploded view of the preferred embodiment of the present invention.
Figure 2:
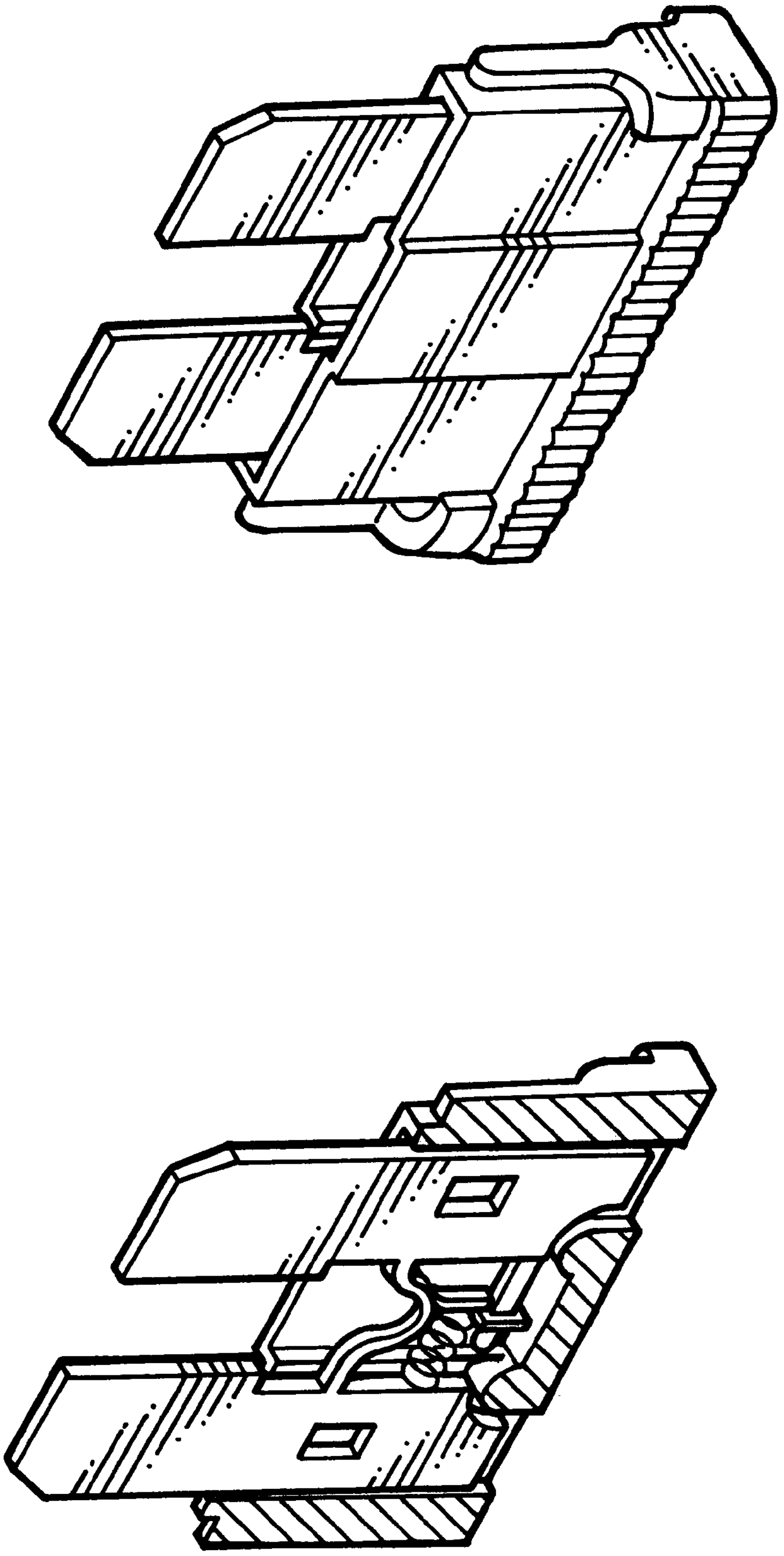
FIG. 2 shows a perspective view of the preferred embodiment of the present invention in combination.

As shown in FIG. 1 and 2, a device 1 embodied in the present invention is used to warn of an automotive circuit breakdown and is composed of a housing 11 and a warning apparatus 12.

The housing 11 has a rectangular base 111 and a shell 112 which is mounted on the base 111 and provided with a receiving slot 113 having an open top. The receiving slot 113 is provided in the bottom thereof with two retaining blocks (not shown in the drawing). The shell 112 is transparent.

The warning apparatus 12 is provided with a negative conductive piece 121, a positive conductive piece 122, a fuse 124 connecting the negative conductive piece 121 and the positive conductive piece 122, a light-emitting diode (LED) 127 fastened with the bottom of the negative conductive piece 121, a coiled spring 125 fastened at one end thereof with the bottom of the positive conductive piece 122, and an elastic piece 126 fastened with other end of the coiled spring 125 such that the elastic piece 126 comes in contact with the fuse 124. The negative conductive piece 121 and the positive conductive piece 122 are provided with a retaining slot 123 engageable with the retaining blocks of the receiving slot 113 of the housing 11.

In combination, the warning apparatus 12 is located securely in the receiving slot 113 of the housing 11 such that the retaining slots 123 of the negative conductive piece 121 and the positive conductive piece 122 are engaged securely with the retaining blocks of the receiving slot 113 of the housing 11.

Figure 3:
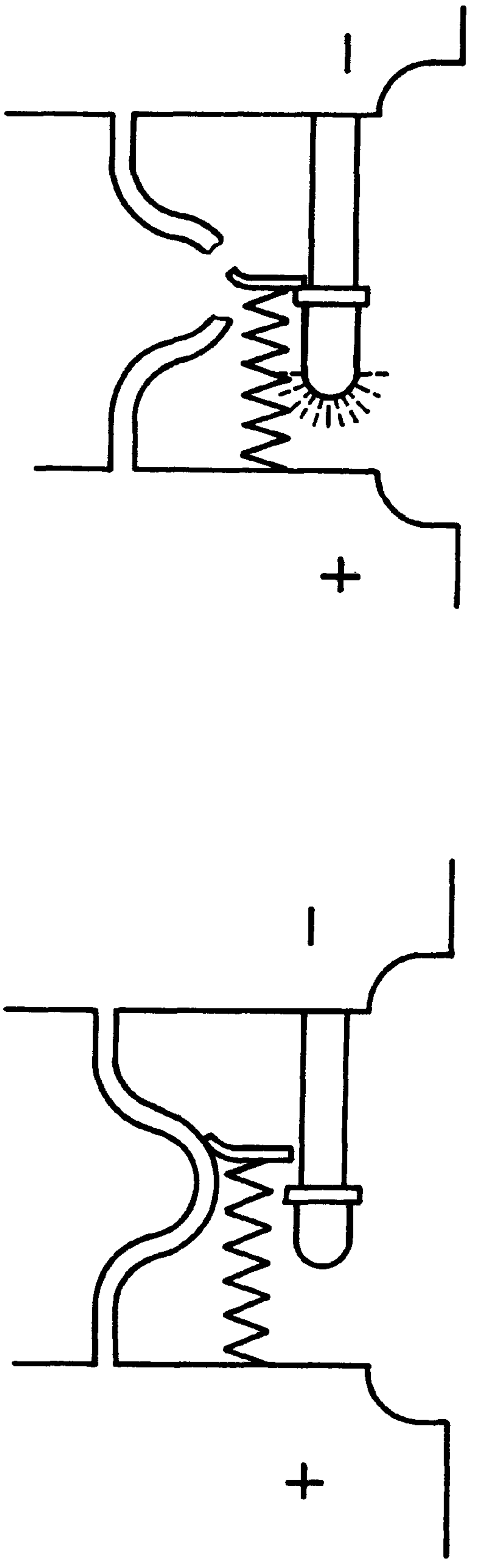
FIG. 3 shows a schematic view of the preferred embodiment of the present invention at work.

The device 1 of the preferred embodiment of the present invention is placed in an automotive circuit as a safeguard. In the event that the electric current becomes too strong, the fuse 124 melts, thus breaking the circuit. As a result, the elastic piece 126 is pulled by the coiled spring 125 to come in contact with a positive current receiver 128 of the light-emitting diode 127. In other words, the electric current is made available via the coiled spring 125, the elastic piece 126, and the positive current receiver 128 to the light-emitting diode, which emits light to warn of the failure of the automotive circuit, as shown in FIG. 3.

The embodiment of the present invention described above is to be regarded in all respects as being merely illustrative and not restrictive. Accordingly, the present invention may be embodied in other specific forms without deviating from the spirit thereof. The present invention is therefore to be limited only by the scope of the following appended claim.

What is claimed is:

1. A device for warning breakdown of an electric circuit of motor vehicles, said device comprising:

a housing having a base and a transparent shell, said shell being mounted on said base and provided with a receiving slot having an open top and a bottom which is provided with two retaining blocks; and a warning apparatus provided with a negative conductive piece having a retaining slot engageable with one of said two retaining blocks, a positive conductive piece having a retaining slot engageable with other one of said two retaining blocks, a fuse connecting said negative conductive piece and said positive conductive piece, a light-emitting diode fastened with said negative conductive piece and provided with a positive current receiver, a coiled spring fastened at one end thereof with said positive conductive piece, and an elastic piece fastened with other end of said coiled spring such that said elastic piece is in contact with said fuse;

said warning apparatus being located in said receiving slot of said housing such that said retaining slots of said negative conductive piece and said positive conductive piece are engaged with said two retaining blocks of said receiving slot of said housing, and that said fuse melts to break the electric circuit which is overloaded with electric current, thereby resulting in said elastic piece being actuated by said coiled spring to come in contact with said positive current receiver of said light-emitting diode so as to make electric current available to said light-emitting diode which emits light to warn of breakdown of the electric circuit of motor vehicles.

* * * * *